(12) United States Patent
Chae

(10) Patent No.: US 9,588,617 B2
(45) Date of Patent: Mar. 7, 2017

(54) DISPLAY DEVICE HAVING TOUCH SENSORS

(71) Applicant: LG Display Co., Ltd., Seoul (KR)

(72) Inventor: Jieun Chae, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 33 days.

(21) Appl. No.: 14/817,162

(22) Filed: Aug. 3, 2015

(65) Prior Publication Data

US 2016/0034097 A1  Feb. 4, 2016

(30) Foreign Application Priority Data

Aug. 4, 2014 (KR) .................. 10-2014-0099716

(51) Int. Cl.
*G06F 3/041* (2006.01)
*G09G 3/32* (2016.01)
(Continued)

(52) U.S. Cl.
CPC ............ *G06F 3/0416* (2013.01); *G06F 3/044* (2013.01); *G06F 3/0412* (2013.01); *G09G 3/3233* (2013.01); *G09G 3/3266* (2013.01); *G09G 3/3677* (2013.01); *G09G 2300/0809* (2013.01); *G09G 2300/0852* (2013.01); *G09G 2300/0861* (2013.01); *G09G 2310/0202* (2013.01); *G09G 2310/0251* (2013.01); *G09G 2310/0267* (2013.01); *G09G 2310/0281* (2013.01); *G09G 2310/0286* (2013.01); *G09G 2310/08* (2013.01);
(Continued)

(58) Field of Classification Search
CPC ......... G06F 3/0416; G06F 3/044; G06F 3/041
See application file for complete search history.

(56) References Cited

U.S. PATENT DOCUMENTS 8,319,737 B2   11/2012   Noguchi et al.
2010/0328239 A1   12/2010   Harada et al.
(Continued)

FOREIGN PATENT DOCUMENTS

CN   103943055 A   7/2014
JP   2009-258182 A   11/2009
(Continued)

OTHER PUBLICATIONS

Taiwan Office Action, Taiwan Application No. 104125263, Jun. 13, 2016, 5 pages.
(Continued)

*Primary Examiner* — Olga Merkoulova
(74) *Attorney, Agent, or Firm* — Fenwick & West LLP

(57) ABSTRACT

A display device and method are discussed. The display device can include a display panel having a pixel array with touch sensors embedded therein; a display driving circuit that time-divides 1 frame period into a plurality of pixel driving periods and a plurality of touch sensing periods and writes input image data to the pixels block by block during the pixel driving periods; and a touch sensing circuit that drives the touch sensors during the touch sensing periods. The display driving circuit includes a gate driver formed on the display panel. A shift register of the gate driver includes a transistor that supplies a high-potential voltage to a Q node of the shift register in response to a compensation pulse generated during the touch sensing periods.

22 Claims, 8 Drawing Sheets

(51) Int. Cl.
*G09G 3/36* (2006.01)
*G06F 3/044* (2006.01)

(52) U.S. Cl.
CPC ............... *G09G 2320/0219* (2013.01); *G09G 2320/0233* (2013.01); *G09G 2320/043* (2013.01); *G09G 2354/00* (2013.01)

(56) References Cited

U.S. PATENT DOCUMENTS

| | | | |
|---|---|---|---|
| 2012/0194489 A1* | 8/2012 | Iwamoto | G09G 3/3685 345/204 |
| 2013/0016804 A1 | 1/2013 | Ahn et al. | |
| 2013/0241814 A1 | 9/2013 | Hirabayashi et al. | |
| 2014/0093028 A1 | 4/2014 | Wu | |
| 2014/0321599 A1* | 10/2014 | Cho | G11C 19/28 377/64 |
| 2016/0274713 A1 | 9/2016 | Zhang et al. | |

FOREIGN PATENT DOCUMENTS

| | | |
|---|---|---|
| KR | 10-2014-0076054 A | 6/2014 |
| TW | 561796 B | 11/2003 |
| TW | 201214359 A | 4/2012 |

OTHER PUBLICATIONS

European Extended Search Report, European Application No. 15171163.7, Dec. 21, 2015, 10 pages.
Korean Office Action, Korean Application No. 10-2015-0161770, Feb. 17, 2016, 5 pages (with concise explanation of relevance).
European Examination Report, European Application No. 15171163.7, Oct. 28, 2016, 7 pages.

\* cited by examiner

DISPLAY DEVICE HAVING TOUCH SENSORS

CROSS-REFERENCE TO RELATED APPLICATION

This application claims the benefit of Korean Patent Application No. 10-2014-0099716, field on Aug. 4, 2014, which is hereby incorporated by reference.

BACKGROUND OF THE INVENTION

1. Field of the Disclosure

This document relates to a display device having touch sensors embedded in a display panel.

2. Related Art

A user interface (UI) enables interactions between humans (users) and various kinds of electric and electronic equipment so that the users can control the equipment easily as they want. Typical examples of the user interface include keypads, keyboards, mouses, on-screen displays (OSD), and remote controllers having an infrared communication function or a radio frequency (RF) communication function. The user interface technology has continuously expanded to enhance user's sensibility and ease of operation. The user interface has been recently developed to include touch UI, voice recognition UI, 3D UI, etc.

The touch UI has been indispensably used in portable information appliances and has been expanded to the use of home appliances. Capacitive touch sensing systems give higher durability and sharpness compared to the existing resistive ones, and can be applied to a wide variety of applications.

Touch sensors in the touchscreen may be placed on a display panel or embedded in the display panel. A display driving circuit comprises a data driver that generates a data voltage and a gate driver that generates a gate pulse (or scan pulse) in synchronization with the data voltage. With the touch sensors embedded in the display panel, the touch sensors and the pixels are electrically coupled, and a signal applied to the pixels may therefore act as noise on the touch sensors. In the case where the touch sensors are embedded in the display panel, 1 frame period for the display panel may be time-divided into a pixel driving period for writing input image data to the pixels and a touch sensing period for driving the touch sensors, in order to reduce the mutual influence of the pixels and the touch sensors on each other.

The 1 frame period for the display panel may be time-divided into a plurality of pixel driving periods and a plurality of touch sensing periods. When the screen of the display panel is divided into first and second blocks B1 and B2, as shown in FIG. 1, input image data is written to the pixels of the first block B1 during a first pixel driving period Td1 and then the touch sensors across the entire screen are driven to sense touch input during a first touch sensing period Tt1, as shown in FIG. 2. Subsequently, input image data is written to the pixels of the second block B2 during a second pixel driving period Td2 and then the touch sensors across the entire screen are driven to sense touch input during a second touch sensing period Tt2.

The gate driver sequentially shifts a gate pulse applied to gate lines by using a shift register. The gate pulse is synchronized with an input image data voltage, i.e., pixel voltage, and sequentially selects pixels to be charged with the data voltage line by line. The shift register comprises stages connected in cascade connection. Each of the stages operates on a D flip-flop basis. Accordingly, the stages produce output upon receiving a start signal or an output from a previous stage as the start signal and receiving a clock.

If there is a touch sensing period Tt1 between the first pixel driving period Td1 and the second pixel driving period Td2, as shown in FIG. 2, the first gate pulse voltage for the second pixel driving period Td2 gets lower and the brightness of the pixels on the first pixel line of the second block B2 becomes different from the brightness of those on the other pixel lines. Due to this, a dim line appears on the boundary between the blocks B1 and B2. This is because the Q node voltage of the shift register that outputs a first gate pulse for the second block B2 is inverted during the touch sensing period Tt1, thus lowering the output voltage of the stages. The touch sensing period Tt1 is much longer than 1 horizontal period. Since the decay time becomes longer as the touch sensing period Tt1 becomes longer, the amount of decay in the Q node voltage of the stages becomes larger. Accordingly, the embedding of touch sensors into a display panel and the time-division of 1 frame period for the display panel into a plurality of pixel driving periods and a plurality of touch sensing periods may cause degradation of the output characteristics of the gate driver. In the conventional art, a touch sensing circuit outputs coordinate data of a single touch input during 1 frame period. Consequently, a general display device's touch report rate is equal to the frame rate for input images.

SUMMARY OF THE INVENTION

In various embodiments, a display device is provided. The display device may include a display panel having a pixel array with touch sensors embedded therein, the pixel array being driven in a plurality of separate blocks, and a display driving circuit configured to time-divide 1 frame period into a plurality of pixel driving periods and a plurality of touch sensing periods and to write input image data to the pixels block by block during the pixel driving periods. The display panel may further include a touch sensing circuit configured to drive the touch sensors during the touch sensing periods. The display driving circuit may include a gate driver. Furthermore, the gate driver is configured to sequentially output a gate pulse to gate lines of the display panel in response to the voltage of a Q node. The gate driver is further configured to supply a high-potential voltage to the Q node in response to a compensation pulse generated during the touch sensing periods.

In a configuration of various embodiments, the gate driver may include a shift register configured to sequentially output a gate pulse to the gate lines of the display panel in response to the voltage of the Q node.

In a configuration of various embodiments, the shift register may include a transistor configured to supply a high-potential voltage to the Q node in response to a compensation pulse generated during the touch sensing periods.

In a configuration of various embodiments, the shift register may be formed, along with the pixel array, on a substrate of the display panel.

In a configuration of various embodiments, if the pixel array of the display panel is divided into N (N is a positive integer equal to or greater than 2) blocks, the display device may be configured to sequentially generate (N−1) compensation pulses during 1 frame period.

In a configuration of various embodiments, the transistor may include: a gate to which the compensation pulse is applied; a drain connected to the Q node; and a source to which the high-potential voltage is supplied.

In a configuration of various embodiments, each of the touch sensing periods may be longer than 1 horizontal period, and the touch report rate may be higher than the frame rate.

In a configuration of various embodiments, if the pixel array of the display panel is divided into N (N is a positive integer equal to or greater than 2) blocks, the transistor may be connected to the Q node of the stage that produces a first output for each of the (N−1) blocks except the first block.

In a configuration of various embodiments, if the pixel array of the display panel is divided into N (N is a positive integer equal to or greater than 2) blocks, the transistor may be connected to the Q node of every stage, in each of the (N−1) blocks except the first block.

In various embodiments, a method for driving a display device is provided. The display device may include a display panel having a pixel array with touch sensors embedded therein, and a display driving circuit configured to drive the display panel, the display driving circuit having a gate driver formed on the display panel. The display device may further include a touch sensing circuit configured to drive the touch sensors. The gate driver may carry out the following: sequentially outputting a gate pulse to gate lines of the display panel in response to the voltage of a Q node, and supplying a high-potential voltage to the Q node in response to a compensation pulse generated during the touch sensing periods.

In a configuration of various embodiments, the display driving circuit may time-divide 1 frame period into a plurality of pixel driving periods and a plurality of touch sensing periods and may write input image data to the pixels block by block during the pixel driving periods. The touch sensing circuit may drive the touch sensors during the touch sensing periods.

In a configuration of various embodiments, if the pixel array of the display panel is divided into N (N is a positive integer equal to or greater than 2) blocks, the display device may sequentially generate (N−1) compensation pulses during 1 frame period.

In a configuration of various embodiments, each of the touch sensing periods may be longer than 1 horizontal period, and the touch report rate may be higher than the frame rate.

In a configuration of various embodiments, if the pixel array of the display panel is divided into N (N is a positive integer equal to or greater than 2) blocks, the transistor may be connected to the Q node of the stage that produces a first output for each of the (N−1) blocks except the first block.

In a configuration of various embodiments, if the pixel array of the display panel is divided into N (N is a positive integer equal to or greater than 2) blocks, the transistor may be connected to the Q node of every stage, in each of the (N−1) blocks except the first block.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
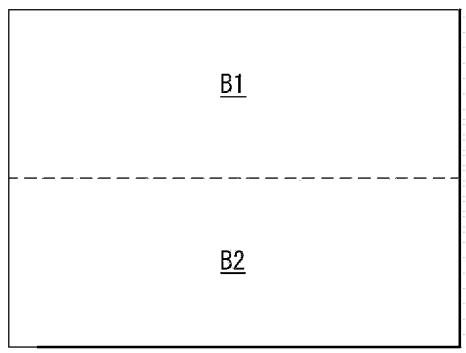
FIG. 1 is a view showing an example where the screen of a display panel is divided into two according to a related art.
Figure 2:
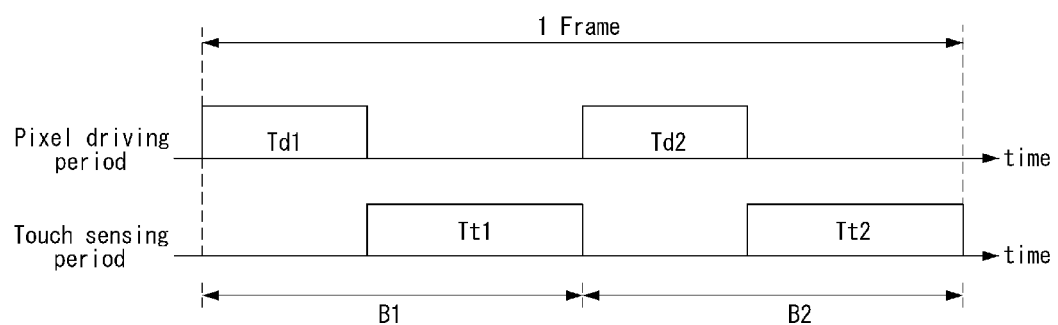
FIG. 2 is a timing diagram showing a method of driving the pixels and touch sensors of the display panel of FIG. 1 in a time-divided manner according to a related art.

Reference will now be made to the preferred embodiments of the present invention, examples of which are illustrated in the accompanying drawings.

Hereinafter, implementations of embodiments of the present invention will be described in detail with reference to the attached drawings.

A display device according to the embodiments of the present invention may be implemented as a flat panel display such as a liquid crystal display (LCD), a field emission display (FED), a plasma display panel (PDP), an organic light emitting display (OLED), an electrophoresis display (EPD), etc.

Throughout the specification, like reference numerals denote substantially like components. Hereinafter, the detailed description of related known functions or configurations that may unnecessarily obscure the subject matter of the present invention in describing the present invention will be omitted.

Figure 3:
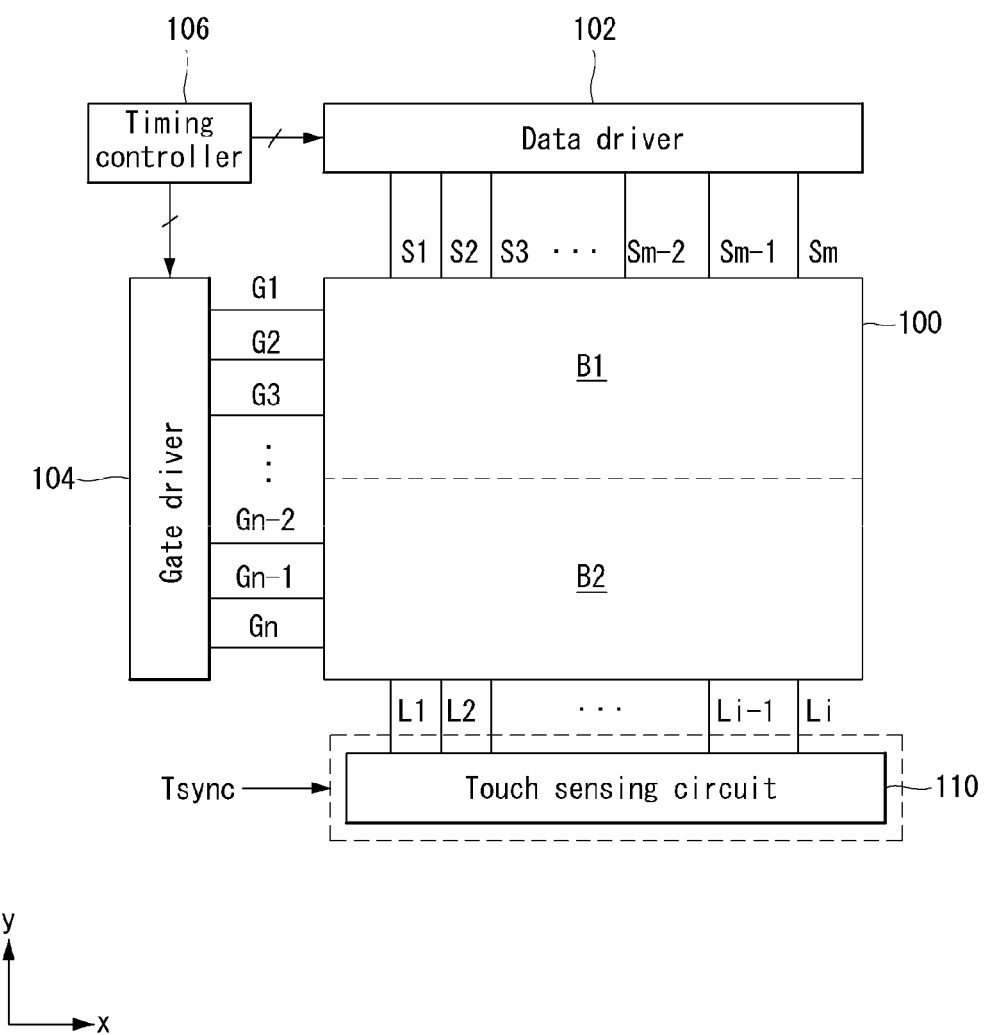
FIG. 3 is a block diagram showing a display device according to an embodiment of the present invention.
Figure 4:
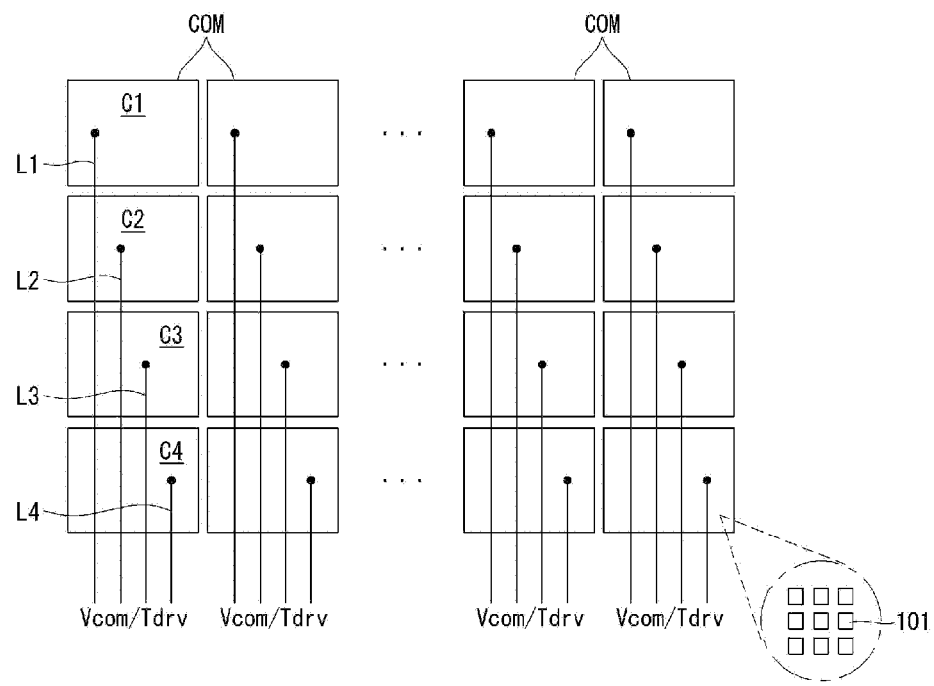
FIG. 4 is a view showing an example of touch sensors embedded in a pixel array.
Figure 5:
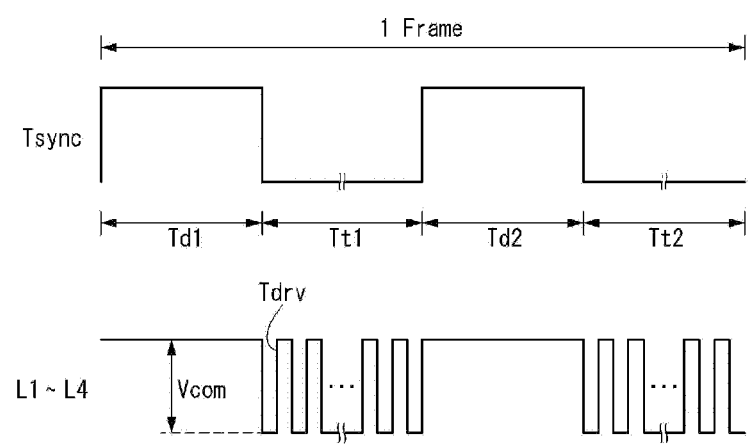
FIG. 5 is a timing diagram showing a method of driving the pixels and touch sensors of the display panel of FIG. 3 in a time-divided manner.

Referring to FIGS. 3 to 5, a display device according to the embodiments of the present invention comprises a display panel 100, a display driving circuit 102 and 104, a touch sensing circuit 110, etc.

The 1 frame period for the display panel 100 may be time-divided into a plurality of pixel driving periods and a plurality of touch sensing periods. The display panel 100 is divided into two or more blocks B1 and B2. The blocks B1 and B2 are divided into pixel-size areas that are driven within the pixel driving periods. Accordingly, the blocks B1 and B2 do not need to be physically split.

The screen of the display panel 100 comprises a pixel array where an input image is reproduced. The pixel array comprises m×n pixels 101 formed in pixel areas defined by m (m is a positive integer) data lines S1 to Sm and n (n is a positive integer) gate lines G1 to Gn. Each of the pixels 101 comprises TFTs (thin film transistors) formed at the crossings of the data lines S1 to Sm and the gate lines G1 to Gn, a pixel electrode to be charged with a data voltage, a storage capacitor Cst connected to the pixel electrode and holding the data voltage, and so on to display an input image. The structure of the pixels 101 may be changed depending on the driving characteristics of the flat panel display.

The pixel array of the display panel 100 comprises touch sensors C1 to C4 and sensor lines L1 to Li (i is a positive integer less than m and n) connected to the touch sensors C1 to C4. A common electrode COM of the pixels 101 is divided into a plurality of segments. The touch sensors C1 to c4 are implemented as the segments of the common electrode COM. A single common electrode segment is commonly connected to a plurality of pixels 101, and forms a single touch sensor. Accordingly, the touch sensors C1 to C4 supply a common voltage Vcom to the pixels 101 during the pixel driving periods Td1 and Td2, and receive a touch driving signal Vdrv to sense touch input during the touch sensing periods Tt1 and Tt2.

The touch sensors C1 to C4 embedded in the pixel array may be implemented as capacitance type touch sensors. The capacitance type touch sensors may be classified into self-capacitance sensors and mutual capacitance sensors. A self-capacitance sensor is formed along a single layer of a conductor line oriented in one direction. A mutual capacitance sensor is formed between two conductor lines intersecting each other. Although FIG. 4 illustrates a self-capacitance type touch sensor, the touch sensors C1 to C4 are not limited thereto.

A black matrix, color filters, etc may be formed on an upper substrate of the display panel 100.

The display driving circuit comprises a data driver 102, a gate driver 104, and a timing controller 106 to write input image data to the pixels 101 of the display panel 100. The display driving circuit time-divides 1 frame period into a plurality of pixel driving periods and a plurality of touch sensing periods, and writes input image data to the pixels block by block during the pixel driving periods.

During the pixel driving periods Td1 and TD2, the data driver 102 converts digital video data of an input image received from the timing controller 106 into an analog positive/negative gamma compensation voltage and then outputs a data voltage through output channels. The data voltage output from the data driver 102 is supplied to the data lines S1 to Sm during the pixel driving periods Td1 and Td2. The output channels of the data driver 102 may be separated from the data lines S1 to Sm and maintained in a high-impedance state during the touch sensing periods Tt1 and Tt2. The data driver 102 may supply an alternating current signal of the same phase as the touch driving signal Tdrv during the touch sensing periods Tt1 and Tt2, in order to reduce the parasitic capacitance between the pixels 101 and the touch sensors C1 to C4. The pixels 101 are held at the data voltage by the storage capacitors since the TFTs are not turned on during the touch sensing periods Tt1 and TT2.

Figure 8:
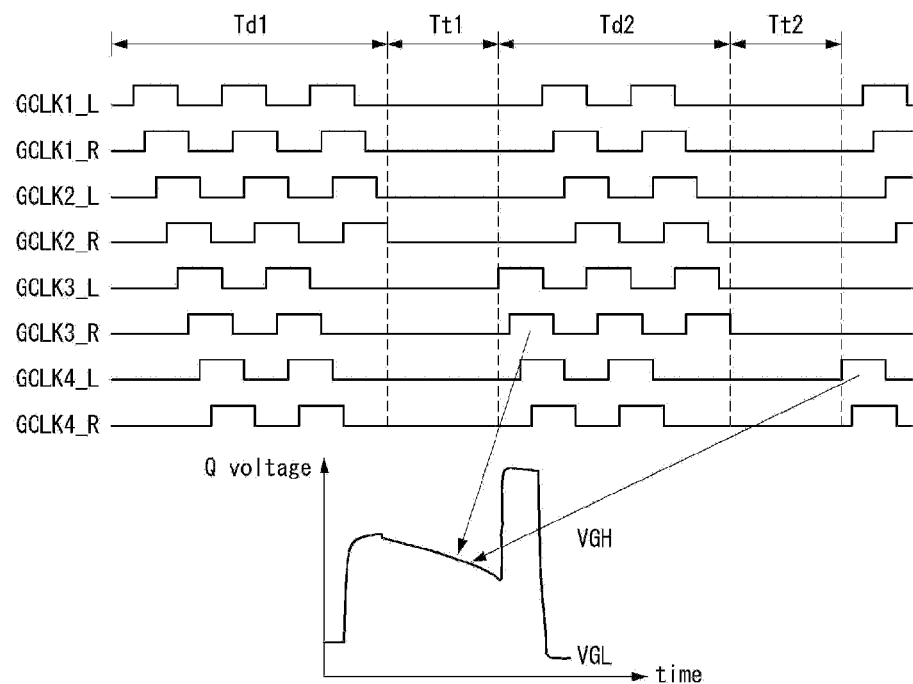
FIG. 8 is a waveform diagram showing an example of decay in Q node voltage in the GIP circuits during touch sensing periods according to an embodiment of the present invention.
Figure 9:
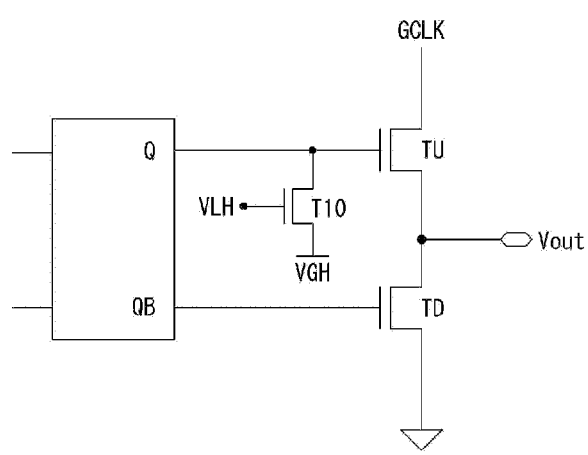
FIG. 9 is a view showing a transistor for preventing decay in Q node voltage according to an embodiment of the present invention.
Figure 10:
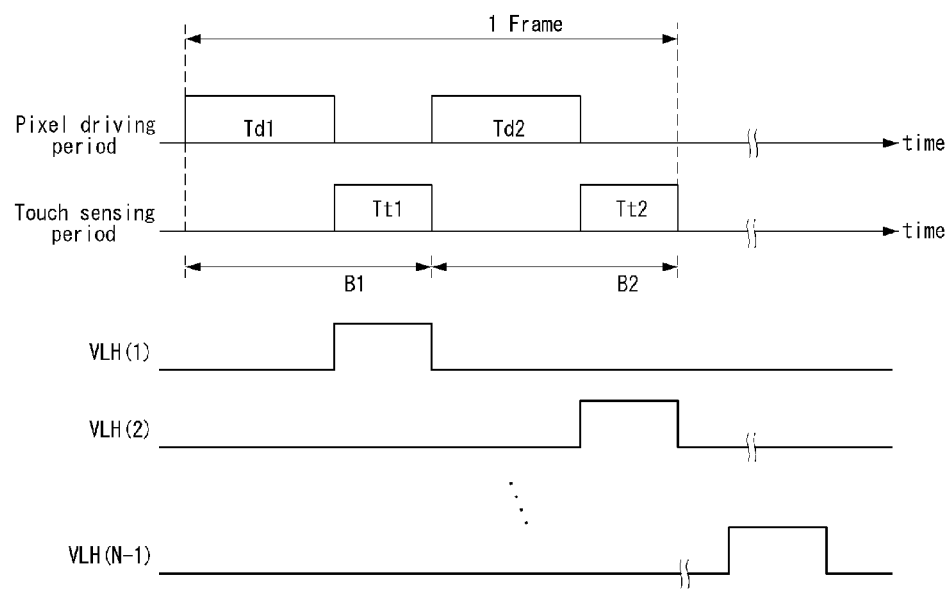
FIG. 10 is a timing diagram showing the operation timing of the transistor for preventing decay in Q node voltage according to an embodiment of the present invention.

During the pixel driving periods Td1 and Td2, the gate driver 104 sequentially supplies a gate pulse (or scan pulse) synchronized with the data voltage to the gate lines G1 to Gn to select lines of the display panel 100 to which the data voltage is written. During the touch sensing periods Tt1 and Tt2, a start signal VST and gate shift clocks GCLK1_L to GCLK4_L and GCLK1_R to GCLK4_R are not input into the gate driver 104. As a consequence, the gate driver 104 outputs no gate pulse during the touch sensing periods Tt1 and Tt2. The gate driver 104 comprises a shift register that sequentially outputs a gate pulse to the gate lines G1 to Gn of the display panel 100. Although a Q node of the shift register of each stage of the gate driver 104, as shown in FIG. 9, is kept in a floating state, it may be discharged by parasitic capacitance during the touch sensing periods Tt1 and Tt2, as shown in FIG. 8.

The gate driver 104 comprises a shift register that sequentially outputs a gate pulse to the gate lines G1 to Gn of the display panel 100 in response to a Q node voltage. The shift register comprises an LH compensation transistor that supplies a high-potential voltage to a Q node in response to an LH (long horizontal time) compensation pulse generated during the touch sensing periods Tt1 and Tt2.

Figure 6:
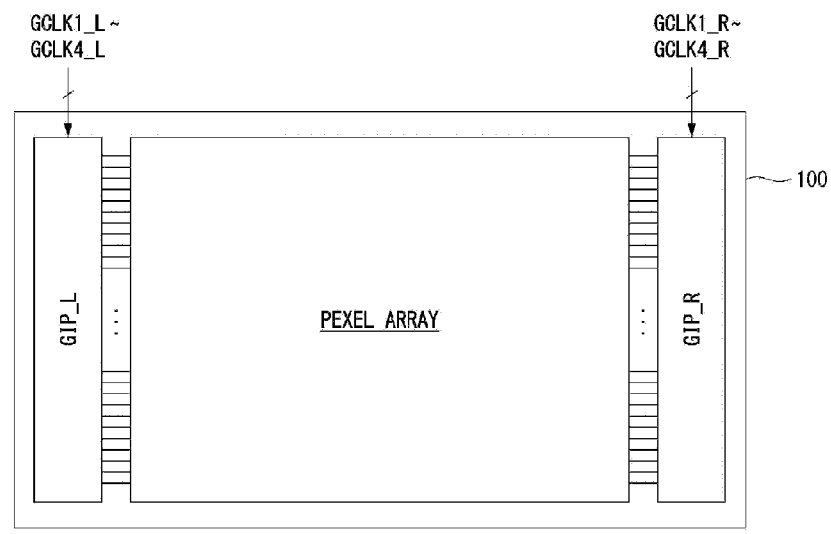
FIG. 6 is a view showing an example of GIP circuits placed on either side of the display panel according to an embodiment of the present invention.

The gate driver 104 may be implemented as GIP (Gate-In-Panel) circuits that are formed together with the pixel array on a lower substrate of the display panel 100, as shown in FIG. 6. The gate driver 104 embedded in and IC may be bonded on the display panel 100. In the GIP circuits, amorphous silicon TFTs such as the TFTs of the pixel array have a high leakage current, i.e., off current, so the amount of current discharged from the Q nodes during the touch sensing periods is relatively large. Accordingly, for GIP circuit applications, there needs to be a way of preventing decay in Q node voltage during the touch sensing periods. The GIP circuits may be placed on a side edge of the display panel 100, or may be placed on either side edge of the display panel 100 as shown in FIG. 6. The GIP circuits GIP_L and GIP_R each comprise a shift register that sequentially shifts a gate pulse under control of the timing controller 106. The transistors of the GIP circuits GIP_L and GIP_R may be formed of the same semiconductor as the TFTs of the pixel array, in order to simplify the manufacturing process. The transistors of the GIP circuits GIP_L and GIP_R may be made as TFTs containing amorphous silicon (a-Si). By the way, the amorphous silicon TFTs have a high off current, i.e., leakage current that flows when they are in the off state. Therefore, in the time-division method shown in FIG. 5, the amount of decay in Q node voltage in the GIP circuits GIP_L and GIP_R may be increased to make the line dim at the boundary of the blocks more distinctive. The display device of this invention compensates for a voltage drop at a Q node by supplying a gate-high voltage VGH to the Q node of the gate driver 104 to raise the Q node voltage.

The transistors of the GIP circuits GIP_L and GIP_R are not limited to the TFTs containing amorphous silicon (a-Si). For instance, the transistors of the GIP circuits GIP_L and GIP_R may comprise one or more of the following: a TFT containing amorphous silicon (a-Si), a TFT containing oxide semiconductor (oxide TFT), and a TFT containing low temperature polysilicon (LTPS TFT).

The timing controller 106 receives timing signals such as a vertical synchronization signal Vsync, horizontal synchronization signal Hsync, data enable signal DE, main clock MCLK, etc input from a host system (not shown), and outputs a data timing control signal for controlling the operation timing of the data driver 102 and a gate timing control signal for controlling the operation timing of the gate driver 104. The data timing control signal comprises a source start pulse SSP, a source sampling clock SSC, a polarity control signal POL, a source output enable signal SOE, etc. The source start pulse SSP controls the sampling start timing of the data driver 102. The source sampling clock SSC is a clock for shifting the data sampling timing. The polarity control signal POL controls the polarity of a data voltage output from the data driver 102. If signals are transmitted between the timing controller 106 and the data driver 102 through a mini LVDS (low voltage differential signaling) interface, the source start pulse SSP and the source sampling clock SSC may be omitted.

Figure 13:
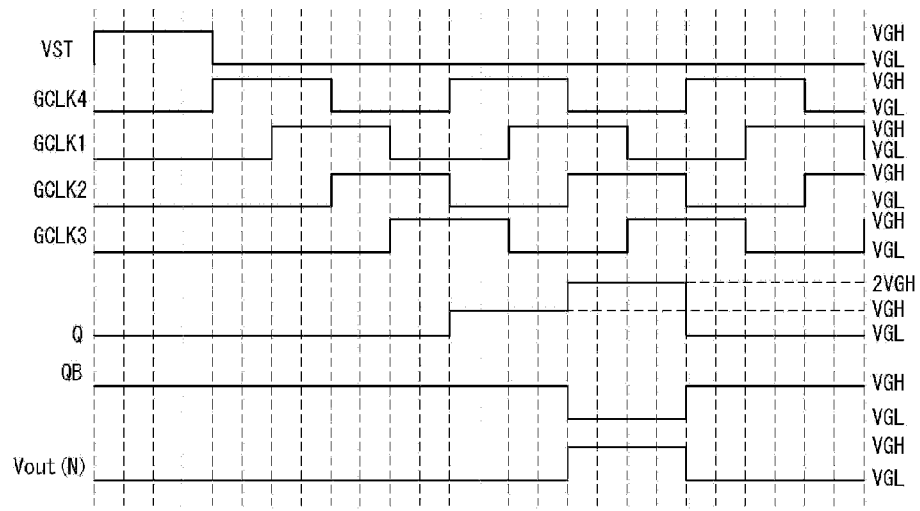
FIG. 13 is a waveform diagram showing the operation of the GIP circuit of FIG. 12.

The gate timing control signal comprises a gate start pulse GSP, a gate shift clock, a gate output enable signal GOE, etc. In the case of the GIP circuits, the gate output enable signal GOE may be omitted. The gate start pulse GSP is input into the shift register and controls the start timing at which a first gate pulse is output from the shift register. The gate shift clock GSC is input into the shift register and controls the shift timing of the shift register. The gate output enable signal GOE defines the pulse width of a gate pulse. If the gate driver 104 is implemented as GIP circuits, a gate timing control signal generated from the timing controller 106 is converted to a voltage swinging between the gate-high voltage VGH and the gate-low voltage VGL and input into the GIP circuits by a level shifter (not shown). Accordingly, the start signal VST and gate shift clocks GCLK1 to CGLK4 input into the GIP circuits swing between the gate-high voltage VGH and the gate-low voltage GLV, as shown in FIG. 13. The gate-high voltage VGH is a voltage higher than the threshold voltage of the transistors constituting the GIP circuits, and the gate-low voltage VGL is a voltage lower than the threshold voltage of those transistors.

The host system may be implemented as any one of the following: a TV system, a set-top box, a navigation system, a DVD player, a Blue-ray player, a personal computer (PC), a home theater system, a phone system, etc. The host system comprises a system-on chip (SoC) with a scaler embedded therein and thus converts digital video data of an input image into a format suitable for displaying on the display panel 100. The host system transmits timing signals Vsync, Hsync, DE, and MCLK, along with the digital video data of the input image, to the timing controller 106. Also, the host system executes an application associated with coordinate data of a touch input received from the touch sensing circuit 110.

The touch sensing circuit 110 drives the touch sensors during the touch sensing periods Tt1 and Tt2 in response to a synchronization signal Tsync input from the timing controller 106 or host system. During the touch sensing periods Tt1 and Tt2, the touch sensing circuit 110 supplies a touch driving signal Vdrv to the touch sensors C1 to C4 through the sensor lines L1 to Li to sense touch input. The touch sensing circuit 110 detects a touch input by analyzing a charge variation across the touch sensors, which depends on the presence or absence of a touch input, and calculates the coordinates of the touch input position. The coordinate data of the touch input position is transmitted to the host system.

In the case where the pixel driving periods Td1 and Td2 and touch sensing periods Tt1 and Tt2, out of 1 frame period, are divided into two parts as shown in FIG. 5, the touch sensing circuit 110 transmits the touch input coordinate data to the host system during every touch sensing period Tt1 and Tt2. Accordingly, the touch report rate is higher than the frame rate. Frame rate is the frequency at which 1 frame image is written to the pixel array. Touch report rate is the rate at which touch input coordinate data is generated. The higher the touch report rate, the higher the rate of touch input coordinate detection, which allows for better touch sensitivity.

Figure 7:
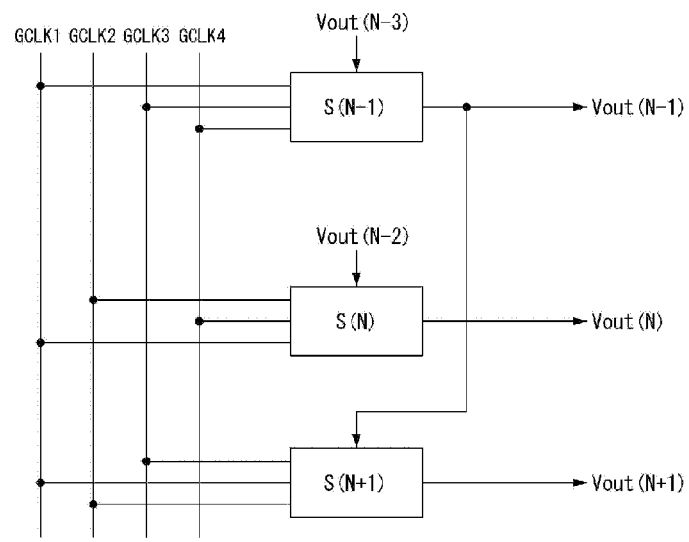
FIG. 7 is a block diagram showing an example of one of the GIP circuits of FIG. 6.

FIG. 6 is a view showing an example of GIP circuits placed on both sides of the display panel. FIG. 7 is a block diagram showing an example of one of the GIP circuits of FIG. 6.

Referring to FIGS. 6 and 7, the GIP circuits GIP_L and GIP_R each comprise a shift register that receives a start signal VST and gate shift clocks GCLK1_L to GLCK4_L and GCLK1_R to GCLK4_R and sequentially outputs a gate pulse. Although the illustrated gate shift clocks GCLK1_L to GLCK4_L and GCLK1_R to GCLK4_R are 4-phase clocks, 2- or 6-phase clocks also may be used. The gate shift clocks GCLK1_L to GLCK4_L and GCLK1_R to GCLK4_R may overlap each other as shown in FIG. 8 to increase the amount of data voltage charge in the pixels 101.

The first GIP circuit GIP_L is placed outside the left side of the pixel array. The shift register of the first GIP circuit GIP_L is connected to the odd-number gate lines G1, G3, . . . , Gn−1 of the pixel array and sequentially outputs a gate pulse to these gate lines G1, G3, . . . , Gn−1. The second GIP GIP_R is placed outside the right side of the pixel array. The shift register of the second GIP circuit GIP_R is connected to the even-numbered gate lines G2, G4, . . . , Gn of the pixel array and sequentially outputs a gate pulse to these gate lines G2, G4, . . . , Gn.

The GIP circuits GIP_L and GIP_R produce output for every gate shift clock GCLK1_L to GLCK4_L and GCLK1_R to GCLK4_R. Accordingly, an Nth (N is a positive integer equal to or greater than 2) gate pulse output from the GIP circuits GIP_L and GIP_R overlaps the end portion of an (N−1)th gate pulse as much as the gate shift clocks GCLK1_L to GLCK4_L and GCLK1_R to GCLK4_R overlap.

The GIP circuits GIP_L and GIP_R each comprise a plurality of stages S(N−1) to S(N+1) connected in cascade connection to which the gate shift clocks GCLK1_L to GLCK4_L and GCLK1_R to GCLK4_R are input.

The stages S(N−1) to S(N+1) each comprise a pull-up transistor, a pull-down transistor, a Q node for controlling the pull-up transistor, and a plurality of transistors. The stages S(N−1) to S(N+1) each may include a QB node for controlling the pull-down transistor. The transistors may be implemented as, but not limited to, n-type MOSFETs (metal oxide semiconductor field effect transistors).

Figure 12:
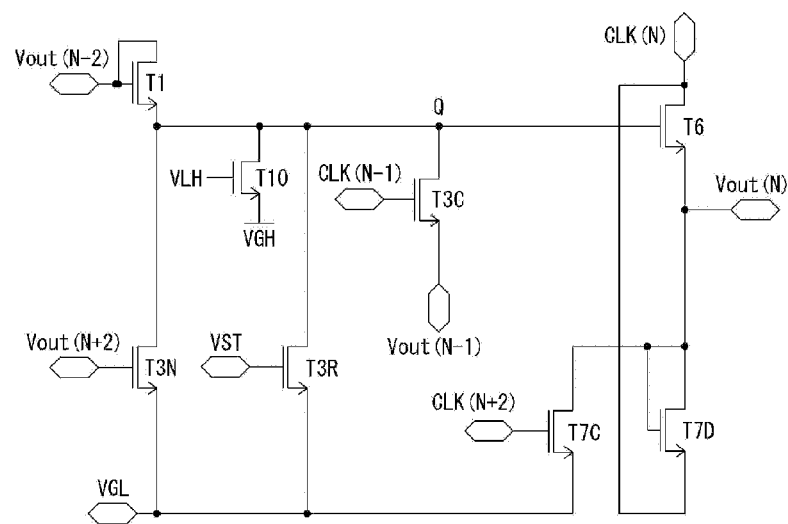
FIG. 12 is a circuit diagram showing an example of a GIP circuit according to an embodiment of the present invention.
Figure 14:
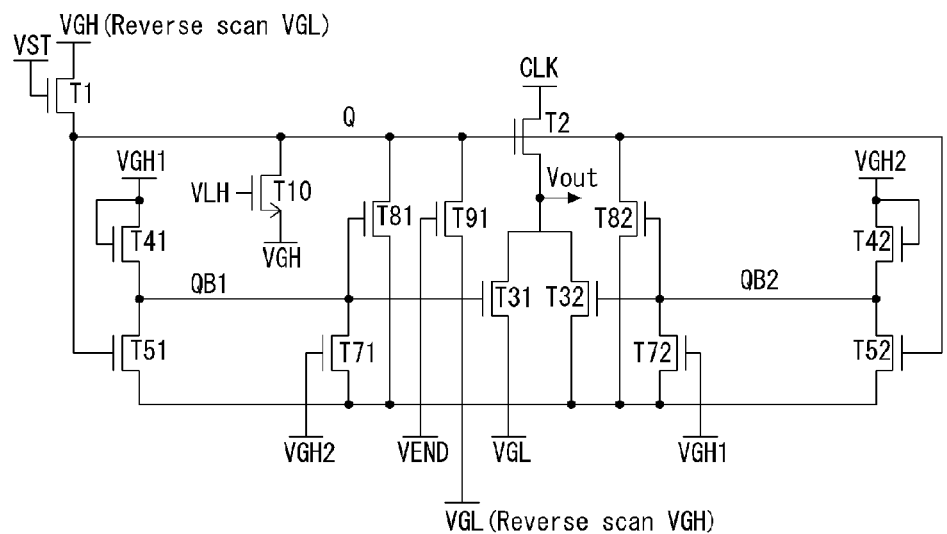
FIG. 14 is a circuit diagram showing another example of a GIP circuit according to an embodiment of the present invention.

The stages S(N−1) to S(N+1) may have, but are not limited to, such a circuit configuration as shown in FIG. 12 or FIG. 14. If the stages S(N−1) to S(N+1) have the circuit configuration shown in FIG. 12, the Nth stage S(N) receives an output Vout(N−2) from the (N−2)th stage as a start signal to charge the Q node, and produces an N-th output Vout(N) when an Nth clock CLK(N) is input. The Nth clock is applied to an Nth gate line and the start signal input terminal of the (N+2)th stage. The first stage receives a separate start signal VST as it is unable to receive output from the previous stage. The connection structure of the stages S(N−1) to S(N+1) is not limited to any particular type of structure as it may vary depending on the phase and pulse width of the gate shift clocks GCLK1_L to GLCK4_L and GCLK1_R to GCLK4_R and depending on how the stage circuits operate.

The Q nodes of the stages S(N−1) to S(N+1) are discharged during the touch sensing periods Tt1 and Tt2, and their voltage decays. Each of the touch sensing periods Tt1 and Tt2 is longer than 1 horizontal period, and this increases the amount of decay in Q node voltage at the stages. Due to this, the stage that outputs a first gate pulse for the next data write block immediately after the touch sensing periods Tt1 and Tt2, generates a lower voltage than the other stages because the first gate pulse is generated after the decay in Q node voltage during the touch sensing periods Tt1 and Tt2, as shown in FIG. 8.

To prevent this problem, an LH compensation TFT for preventing decay in Q node voltage is connected to the Q node of this stage, as shown in FIG. 9. The LH compensation TFT T10 prevents decay in the voltage of a Q node by supplying the gate-high voltage VGH, i.e., a high-potential voltage, to the Q node in response to an LH compensation pulse VLH generated during the touch sensing periods Tt1 and Tt2. The LH compensation TFT T10 may be connected to the first stage for each block that produces a first output, in the GIP circuit connected to the block B2 except the first block B1. Alternatively, the LH compensation TFT T10 may be connected to every stage in the GIP circuit connected to the block B2 except the first block B1.

The amount of decay in Q node voltage is large only at the stage connected to the first gate line of the block to which data is written after the touch sensing periods. The GIP circuit connected to the block except the block to which data is written immediately after the touch sensing periods outputs no gate-high voltage VGH but maintains the output voltage at the gate-low voltage VGL. If an LH compensation pulse VLH is applied to the Q node in the GIP circuit connected to the block except the block to which data is written immediately after the touch sensing periods, an unnecessary leakage current may be generated. The GIP circuit connected to the first block B1 produces output without decay in Q node voltage caused by the touch sensing periods Tt1 and TT2 because the output is produced at the initial stage of each frame period. Accordingly, the LH compensation pulse VLH may be sequentially output block by block along a scan direction so that it is applied only to the Q nodes in the GIP circuit connected to the current block, to which data is written immediately after the touch sensing periods. If the pixel array of the display panel 100 is divided into N blocks, the LH compensation pulse VLH may be generated every touch sensing period, that is, (N−1) LH compensation pulses VLH(1) to VLH(N−1) may be sequentially generated during 1 frame period.

Figure 11:
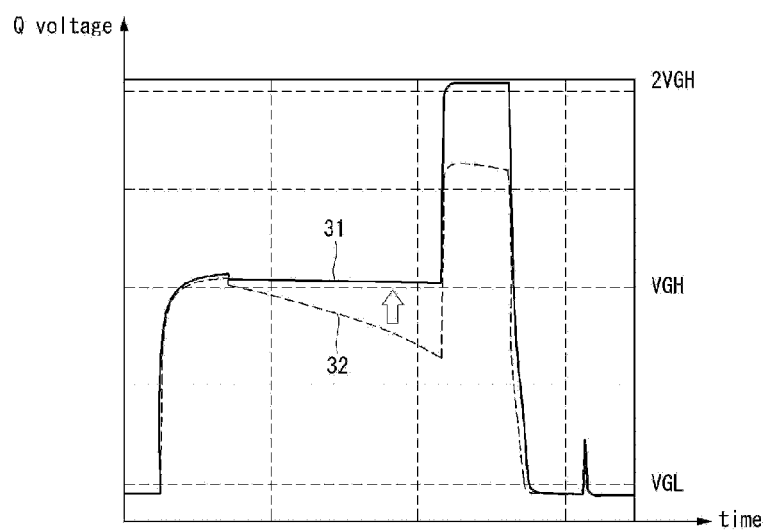
FIG. 11 is a waveform diagram showing a variation in Q node voltage caused by the transistor for preventing decay in Q node voltage according to an embodiment of the present invention.

In FIG. 11, reference numeral '32' represents a test result that shows the Q node voltage decaying during the touch sensing periods Tt1 and Tt2. Reference numeral '31' represents a test result that shows the Q node voltage during the touch sensing periods Tt1 and Tt2 when a high-potential voltage is applied to the Q node by the LH compensation TFT T10. In the present invention, the decay in Q node voltage is compensated for by raising the Q node voltage of the stage that produces a first output for the next data write block immediately after the touch sensing periods.

FIG. 12 is a circuit diagram showing a GIP circuit, and FIG. 13 is a waveform diagram showing the operation of the GIP circuit of FIG. 12.

Referring to FIGS. 12 and 13, an Nth stage of the GIP circuit comprises a Q node and a plurality of TFTs.

A TFT 1 T1 charges the Q node with the gate-high voltage VGH in response to an output VOUT(N−2) from an (N−2)th stage. A TFT 3N T3N discharges the Q node down to a gate-low voltage VGL in response to an output VOUT(N+2) from an (N+2)th stage. A TFT 3R T3R discharges the Q node down to the gate-low voltage VGL in response to a start signal VST to initialize the Q node of every stage at the initial stage of 1 frame period. A TFT 3C T3C supplies an output voltage from an (N−1)th stage to the Q node in response to an (N−1)th clock CLK(N−1).

When the gate-high voltage VGH of an Nth clock CLK (N) is input into the drain of a TFT 6 T6 while the Q node has been pre-charged up to the gate-high voltage VGH, the Q node is bootstrapped to a higher voltage due to the parasitic capacitance between the gate and drain of the TFT 6 T6. When the Nth clock CLK(N) is input, the TFT 6 T6 raises the voltage of the output terminal to the gate-high voltage VGH and outputs an Nth gate pulse Vout(N). The TFT 6 T6 operates as a pull-up transistor.

A TFT 7C T7C discharges the output terminal down to the gate-low voltage VGL in response to an (N+2)th clock CLK(N+2). A TFT 7D T7D operates as a diode, with its gate and drain being connected to the output terminal. When the output terminal is at the gate-high voltage VGH and the voltage of the Nth clock CLK(N) is lowered to the gate-low voltage VGL, the TFT 7D T7D is turned on to decrease the voltage of the output terminal, thereby alleviating a deterioration of the TFT 7C T7C.

Figure 15:
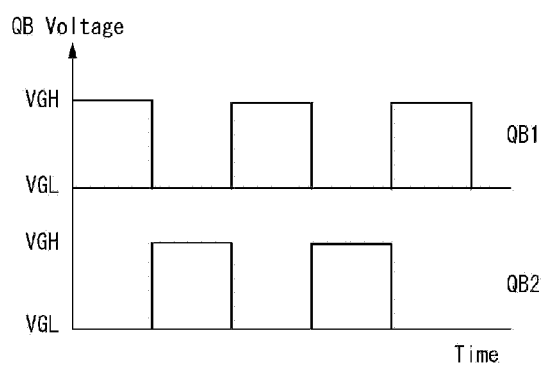
FIG. 15 is a waveform diagram showing the QB node voltage of the GIP circuit of FIG. 14.

FIG. 14 is a circuit diagram showing another example of a GIP circuit, and FIG. 15 is a waveform diagram showing the QB node voltage of the GIP circuit of FIG. 14.

Referring to FIGS. 14 and 15, this GIP circuit may selectively change the shift direction of output. Also, this GIP circuit may compensate for gate bias stress on the pull-down transistors connected to the QB nodes by converting the QB node voltage to an AC voltage.

In forward scan, a TFT 1 T1 charges the Q node with the gate-high voltage VGH in response to a start signal VST or an output from the previous stage. A TFT 41 T41 is a diode that supplies a first gate-high voltage VGH1 to a first QB node QB1. A TFT 51 T51 discharges the first QB node QB1 in response to the voltage of the Q node charged with the gate-high voltage VGH. A TFT 71 T71 discharges the first QB node QB1 in response to a second gate-high voltage VGH2. A TFT 81 T81 discharges the Q node in response to the voltage of the first QB node QB1 charged with the first gate-high voltage VGH1. In forward scan, a TFT 91 T91 discharges the Q node in response to the voltage VEND of the next stage.

A TFT 42 T42 is a diode that supplies the second gate-high voltage VGH2 to the second QB node QB2. A TFT 52 T52 discharges the second QB node QB2 in response to the voltage of the Q node charged with the gate-high voltage VGH. A TFT 72 T72 discharges the second QB node QB2 in response to the first gate-high voltage VGH1. A TFT 82 T82 discharges the Q node in response to the voltage of the second QB node QB2 charged with the second gate-high voltage VGH2.

A TFT 2 T2 is a pull-up transistor that raises the voltage of the output terminal when a clock CLK is input. TFTs 31 and 32 T31 and T32 are pull-down transistors that are alternately turned on in response to the voltages of the first and second QB nodes QB1 and QB2 to discharge the output terminal.

When a DC voltage is applied to the QB node for a long time, the threshold voltage of the TFTs 31 and 32 connected to the QB nodes is shifted due to gate bias stress. To alleviate the gate bias stress, the first gate-high voltage VGH1 and the second gate-high voltage VGH2 are generated alternately at predetermined time intervals. Accordingly, the first and second QB nodes QB1 and QB2 are alternately charged and discharged as shown in FIG. 15.

In forward scan, the TFT 1 T1 pre-charges the Q node in response to an output from the previous stage, and a TFT T9 discharges the Q node in response to an output from the next stage. In reverse scan, the gate-low voltage VGL is applied to the drain of the TFT 1 T1, and the gate-high voltage VGH is applied to the drain of the TFT 9 T9. That is, in reverse scan, the TFT 1 T1 and the TFT 9 T9 operate in the opposite way. The TFT 1 T1 and the TFT 9 T9 are made to have the same channel ratio W/L to achieve the same output characteristics.

In each of the GIP circuits shown in FIGS. 12 to 14, the LH compensation TFT T10 supplies the gate-high voltage VGH to the Q node in response to an LH compensation voltage VLH generated during the touch sensing periods Tt1 and Tt2. The drain of the LH compensation TFT T10 is connected to the Q node. The LH compensation pulse VLH is applied to the gate of the LH compensation TFT T10, and the gate-high voltage VGH is applied to the source of the LH compensation TFT T10.

As described above, in one or more embodiments of the present invention, a transistor is connected to a Q node of the gate driver to supply a high-potential voltage to the Q node in response to a compensation pulse generated during the touch sensing periods. As a consequence, the display device according to the embodiments of the present invention can achieve high picture quality without a line dim by preventing degradation of the output characteristics of the gate driver, which is caused when 1 frame period for the display panel with touch sensors embedded therein is time-divided into a plurality of pixel driving periods and a plurality of touch sensing periods.

In various embodiments, the shift register including the transistor supplying a high-potential voltage to the Q node in response to a compensation pulse generated during the touch sensing periods may be replaced by an alternative circuit providing a similar function. By way of example, a controller such as e.g. a programmable microcontroller may be provided to sequentially supply a high-potential voltage at an output. The output may be connected to a multiplexer. The multiplexer may include a plurality of outputs, wherein each output may correspond to an output of a shift register implementation. The sequentially supplied high-potential voltage may be then sequentially supplied at the respective outputs of the multiplexer circuit.

What is claimed is:

1. A display device comprising:
a display panel comprising a pixel array with touch sensors embedded therein, the pixel array being divided into at least a first block and a second block of pixels and being operated with each frame period time-divided into at least a first pixel driving period, a second pixel driving period, a first touch driving period, and a second touch driving period, the first and the second pixel driving periods alternating with the first and the second touch driving periods;
a display driving circuit configured to write input image data to the first block of pixels during the first pixel driving period and the second block of pixels during the second pixel driving period; and
a touch sensing circuit configured to drive the touch sensors during the first touch driving period and the second touch driving period,
the display driving circuit comprising a gate driver including a shift register with a Q node,
wherein the gate driver is configured to sequentially output a gate pulse to gate lines of the display panel in response to a voltage of the Q node, the gate pulse alternating between a high-potential voltage and a low-potential voltage during the first and second pixel driving periods, and
wherein the gate driver is further configured to supply the high-potential voltage to the Q node in response to a compensation pulse generated during the first and second touch driving periods.

2. The display device of claim 1,
wherein the shift register is configured to sequentially output the gate pulse to the gate lines of the display panel in response to the voltage of the Q node.

3. The display device of claim 2,
wherein the shift register comprises a transistor configured to supply the high-potential voltage to the Q node in response to the compensation pulse.

4. The display device of claim 1,
wherein the shift register is formed, along with the pixel array, on a substrate of the display panel.

5. The display device of claim 1,
wherein the pixel array of the display panel is divided into N (N is a positive integer equal to or greater than 2) blocks, and the display device is configured to sequentially generate (N−1) compensation pulses during said each frame period.

6. The display device of claim 3,
wherein the transistor comprises:
a gate to which the compensation pulse is applied;
a drain connected to the Q node; and
a source to which the high-potential voltage is supplied.

7. The display device of claim 1,
wherein each of the first and second touch driving periods is longer than 1 horizontal period, and
wherein a touch report rate is higher than a frame rate.

8. The display device of claim 1,
wherein the pixel array of the display panel is divided into N (N is a positive integer equal to or greater than 2) blocks, and the transistor is connected to the Q node of a stage that produces a first output for each of the (N−1) blocks except a first block.

9. The display device of claim 1,
wherein the pixel array of the display panel is divided into N (N is a positive integer equal to or greater than 2) blocks, and the transistor is connected to the Q node of every stage, in each of the (N−1) blocks except a first block.

10. A method for driving a display device, the display device including a display panel having a pixel array with touch sensors embedded therein, the pixel array being divided into at least a first block and a second block of pixels and being operated with each frame period time-divided into at least a first pixel driving period, a second pixel driving period, a first touch driving period, and a second touch driving period, the first and the second pixel driving periods alternating with the first and the second touch driving periods, the method comprising:
writing input image data to the first block of pixels during the first pixel driving period and the second block of pixels during the second pixel driving period;
driving the touch sensors during the first and the second touch driving periods;
sequentially outputting a gate pulse to gate lines of the display panel in response to a voltage of the Q node of a shift register included in a gate driver, the gate pulse alternating between a high-potential voltage and a low-potential voltage during the first and second pixel driving periods; and
supplying the high-potential voltage to the Q node in response to a compensation pulse generated during the first and second touch driving periods.

11. The method of claim 10,
wherein the pixel array of the display panel is divided into N (N is a positive integer equal to or greater than 2) blocks, and the display device sequentially generates (N−1) compensation pulses during said each frame period.

12. The method of claim 10,
wherein each of the first and second touch driving periods is longer than 1 horizontal period, and
wherein a touch report rate is higher than a frame rate.

13. The method of claim 11,
wherein the pixel array of the display panel is divided into N (N is a positive integer equal to or greater than 2) blocks, and a transistor is connected to the Q node of a stage that produces a first output for each of the (N−1) blocks except a first block.

14. The method of claim 11,
wherein the pixel array of the display panel is divided into N (N is a positive integer equal to or greater than 2) blocks, and a transistor is connected to the Q node of every stage, in each of the (N−1) blocks except a first block.

15. A driving device of a pixel array with touch sensors embedded therein, the pixel array being divided into at least a first block and a second block of pixels and being operated with each frame period time-divided into at least a first pixel driving period, a second pixel driving period, a first touch driving period, and a second touch driving period, the first and the second pixel driving periods alternating with the first and the second touch driving periods, the driving device comprising:
    a display driving circuit configured to write input image data to the first block of pixels during the first pixel driving period and the second block of pixels during the second pixel driving period; and
    a touch sensing circuit configured to drive the touch sensors during the first and the second touch driving periods,
    wherein the display driving circuit supplies a high-potential voltage to a Q node of a shift register during the first and second touch driving periods, and the shift register shifts a gate pulse being supplied to gate lines of the pixel array, the gate pulse alternating between the high-potential voltage and a low-potential voltage during the first and second pixel driving periods.

16. The driving device of claim 15, wherein the display driving circuit comprises a gate driver disposed on a substrate of a display panel together with the pixel array,
wherein the gate driver supplies the gate pulse to the gate lines using the shift register,
wherein the shift register comprises a plurality of stages connected in cascade connection to output and shift the gate pulse to the gate line, and
the shift register comprises a transistor that supplies the high-potential voltage to the Q node in response to a compensation pulse generated during the first and second touch driving periods.

17. The driving device of claim 16, wherein the pixel array is divided into N (N is a positive integer equal to or greater than 2) blocks, and (N−1) compensation pulses are sequentially generated during said each frame period.

18. The driving device of claim 17, wherein the compensation pulse is sequentially output one by one at every block so as to be applied to the Q node that controls a pull-up transistor of a block in which present data is written immediately after the first or the second touch driving period.

19. The driving device of claim 16, wherein the transistor comprises:
    a gate to which the compensation pulse is applied;
    a drain connected to the Q node; and
    a source to which the high-potential voltage is supplied.

20. The driving device of claim 16, wherein each of the first and the second touch driving periods is longer than 1 horizontal period, and the touch report rate is higher than a frame rate.

21. The driving device of claim 16, wherein the pixel array of the display panel is divided into N (N is a positive integer equal to or greater than 2) blocks, and the transistor is connected to the Q node of the stage that produces a first output for each of the (N−1) blocks except a first block.

22. The driving device of claim 16, wherein the pixel array of the display panel is divided into N (N is a positive integer equal to or greater than 2) blocks, and the transistor is connected to the Q node of every stage, in each of the (N−1) blocks except a first block.

* * * * *